US012670588B2

(12) United States Patent
Fitzke et al.

(10) Patent No.: US 12,670,588 B2
(45) Date of Patent: Jun. 30, 2026

(54) SYSTEMS AND METHODS FOR CLASSIFYING PET INFORMATION

(71) Applicant: MARS, INCORPORATED, McLean, VA (US)

(72) Inventors: Michael Wolfgang Fitzke, Verden (DE); Mark Justin Parkinson, Newark, NJ (US); André Dourson, Haguenau (FR); Robert Michael Wiggall, West Yorkshire (GB)

(73) Assignee: MARS, INCORPORATED, McLean, VA (US)

( * ) Notice: Subject to any disclaimer, the term of this patent is extended or adjusted under 35 U.S.C. 154(b) by 342 days.

(21) Appl. No.: 18/266,127

(22) PCT Filed: Dec. 14, 2021

(86) PCT No.: PCT/US2021/063361
§ 371 (c)(1),
(2) Date: Jun. 8, 2023

(87) PCT Pub. No.: WO2022/132804
PCT Pub. Date: Jun. 23, 2022

(65) Prior Publication Data
US 2024/0037734 A1 Feb. 1, 2024

Related U.S. Application Data

(60) Provisional application No. 63/125,317, filed on Dec. 14, 2020.

(51) Int. Cl.
*G06V 10/764* (2022.01)
*G06T 7/00* (2017.01)
(Continued)

(52) U.S. Cl.
CPC .............. *G06T 7/0012* (2013.01); *G06T 7/11* (2017.01); *G06V 10/764* (2022.01); *G06V 20/50* (2022.01);
(Continued)

(58) Field of Classification Search
None
See application file for complete search history.

(56) References Cited

U.S. PATENT DOCUMENTS

| | | | |
|---|---|---|---|
| 4,873,644 | A | 10/1989 | Fujii et al. |
| 10,755,230 | B2 | 8/2020 | Mehring et al. |

(Continued)

FOREIGN PATENT DOCUMENTS

| | | |
|---|---|---|
| CN | 1072355 A | 5/1993 |
| CN | 106651883 A | 5/2017 |

(Continued)

OTHER PUBLICATIONS

Extended European Search Report dated Oct. 7, 2024 in Application No. EP 21907651.

(Continued)

*Primary Examiner* — Tsung Yin Tsai
(74) *Attorney, Agent, or Firm* — Baker Botts L.L.P.

(57) ABSTRACT

Systems, methods, and apparatus are disclosed for analyzing an input image that includes a view of fecal matter. One example method includes: receiving an input image from a client device; determining that the input image comprises a view of fecal matter excreted by an animal; processing at least a portion of the input image comprising the view of the fecal matter using one or more machine learning models to generate a classification of the fecal matter or a health assessment of the animal; generating a recommendation for the animal based on the classification of the fecal matter or the health assessment of the animal; and displaying infor- (Continued)

mation related to the recommendation for the animal to a user. Some embodiments involve outputting confidence scores associated with one or more of the other outputs. Some embodiments implement Client-Server architecture and follow a Software as a Service (SaaS) model.

18 Claims, 5 Drawing Sheets

(51) Int. Cl.
  *G06T 7/11* (2017.01)
  *G06V 20/50* (2022.01)
(52) U.S. Cl.
  CPC .............. *G06T 2207/20021* (2013.01); *G06T 2207/20081* (2013.01); *G06T 2207/20084* (2013.01); *G06T 2207/30004* (2013.01); *G06V 2201/03* (2022.01)

(56) References Cited

U.S. PATENT DOCUMENTS

| | | | |
|---|---|---|---|
| 10,776,663 B1 | 9/2020 | Bogdanovych et al. | |
| 10,860,263 B1 | 12/2020 | Ruiz et al. | |
| 11,763,920 B2* | 9/2023 | Zedayko | G16H 20/30 |
| | | | 705/2 |
| 11,803,962 B2* | 10/2023 | Zedayko | G16H 20/70 |
| 2009/0081339 A1 | 3/2009 | Evans et al. | |
| 2010/0235285 A1* | 9/2010 | Hoffberg | G06Q 50/188 |
| | | | 705/37 |
| 2013/0028487 A1 | 1/2013 | Stager et al. | |
| 2015/0120759 A1 | 4/2015 | Kang | |
| 2016/0203591 A1 | 7/2016 | Justaniah et al. | |
| 2018/0196403 A1 | 7/2018 | Lagares-Greenblatt et al. | |
| 2018/0211380 A1* | 7/2018 | Tandon | G06V 20/69 |
| 2018/0314888 A1 | 11/2018 | Koul et al. | |
| 2018/0322327 A1 | 11/2018 | Smith et al. | |
| 2018/0322660 A1* | 11/2018 | Smith | G06T 7/97 |
| 2018/0363031 A1 | 12/2018 | Becares et al. | |
| 2019/0050534 A1* | 2/2019 | Apte | C12Q 1/689 |
| 2019/0251694 A1 | 8/2019 | Han et al. | |
| 2019/0385026 A1 | 12/2019 | Richeimer et al. | |
| 2021/0035289 A1* | 2/2021 | Zedayko | G16H 30/20 |
| 2021/0151137 A1* | 5/2021 | Zedayko | G16H 20/30 |
| 2021/0224312 A1 | 7/2021 | Harikumar et al. | |
| 2021/0279503 A1 | 9/2021 | Qi et al. | |
| 2021/0279784 A1 | 9/2021 | Wu | |
| 2021/0311011 A1 | 10/2021 | Overcash et al. | |
| 2021/0374453 A1 | 12/2021 | Kuo et al. | |
| 2022/0076228 A1 | 3/2022 | Eger | |
| 2022/0157134 A1 | 5/2022 | Sriraman et al. | |
| 2022/0198209 A1 | 6/2022 | Spears et al. | |
| 2023/0104704 A1* | 4/2023 | Maasland | G06V 20/69 |
| | | | 382/128 |
| 2023/0274560 A1 | 8/2023 | Bordone et al. | |
| 2024/0281864 A1 | 8/2024 | Rao et al. | |
| 2024/0386551 A1 | 11/2024 | Rajapakse et al. | |
| 2025/0054265 A1 | 2/2025 | Zhu et al. | |

FOREIGN PATENT DOCUMENTS

| | | |
|---|---|---|
| CN | 110070056 A | 7/2019 |
| CN | 111222546 A | 6/2020 |
| CN | 111274986 A | 6/2020 |
| CN | 111369572 A | 7/2020 |
| CN | 111625668 A | 9/2020 |
| CN | 111630551 A | 9/2020 |
| EP | 3 659 433 A1 | 6/2020 |
| WO | WO 2019/143714 A1 | 7/2019 |
| WO | 2020115248 A1 | 6/2020 |
| WO | 2021022162 A1 | 2/2021 |
| WO | 2022132804 A1 | 6/2022 |

OTHER PUBLICATIONS

Yang et al., "StoolNet for Color Classification of Stool Medical Images," Electronics, [Online] 8:1464, 15 pgs. (2019).

International Search Report mailed Mar. 1, 2022, in International Application No. PCT/US2021/063361.

Pereira et al., "An Image Analysis Framework for Effective Classification of Seed Damages", Proceedings of the 31ST Annual ACM Symposium On Applied Computing, SAC '16, ACM Press, New York, New York, USA, Apr. 4, 2016, pp. 61-66.

* cited by examiner

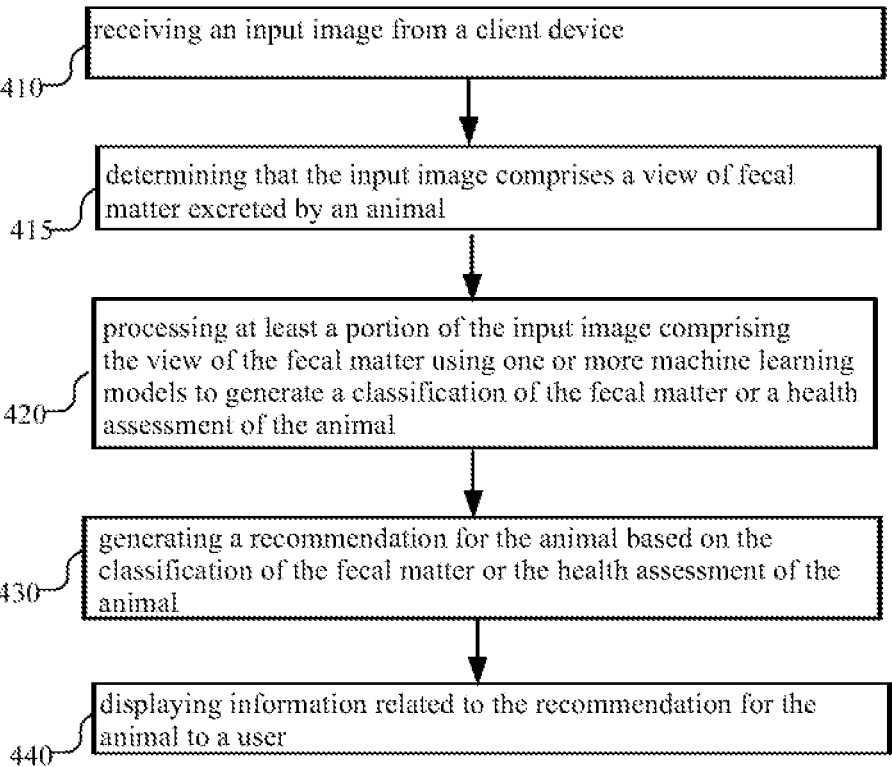

400 receiving an input image from a client device
410 determining that the input image comprises a view of fecal matter excreted by an animal
415 processing at least a portion of the input image comprising the view of the fecal matter using one or more machine learning models to generate a classification of the fecal matter or a health assessment of the animal
420 generating a recommendation for the animal based on the classification of the fecal matter or the health assessment of the animal
430 displaying information related to the recommendation for the animal to a user
440

SYSTEMS AND METHODS FOR CLASSIFYING PET INFORMATION

BENEFIT CLAIM

This application is a U.S. National Stage Patent Application under 35 U.S.C. § 371 of International Patent Application No. PCT/US2021/063361, filed on Dec. 14, 2021, which claims the benefit under 35 U.S.C. § 119 of U.S. Provisional Application No. 63/125,317, filed on Dec. 14, 2020, the entire contents of each of which are hereby incorporated by reference in their entireties, and to which priority is claimed.

TECHNICAL FIELD

This disclosure generally relates to using machine learning systems to process pet information.

BACKGROUND

Pet owners are increasingly interested in monitoring the health of their pets using digital products, which can leverage technology to prevent or pre-empt any illnesses or diseases. Investigation of fecal matter is a common method of identifying and diagnosing potential health problems in pets, especially related to digestive issues. Investigation of fecal matter, however, is subjective, can be difficult for owners to perform, and can often require professional consultation. Accordingly, there is a need in the industry to allow pet owners to conveniently monitor fecal matter in a manner that will improve the overall health of their pets.

SUMMARY OF CERTAIN NON-LIMITING EMBODIMENTS

Certain non-limiting embodiments provide systems, methods, and storage media for using machine learning systems to classify pet information. Certain non-limiting embodiments can be directed to a computer-implemented method. The computer-implemented method can include one or more of: receiving an input image from a client device; determining that the input image comprises a view of fecal matter excreted by an animal; processing at least a portion of the input image comprising the view of the fecal matter using one or more machine learning models to generate a classification of the fecal matter or a health assessment of the animal; generating a recommendation for the animal based on the classification of the fecal matter or the health assessment of the animal; and displaying information related to the recommendation for the animal to a user.

In one embodiment, the classification of the fecal matter comprises a score of the fecal matter that indicates a health metric related to the animal.

One embodiment further comprises applying a segmentation mask to the input image.

One embodiment further comprises generating and displaying an indication of a confidence score, wherein the confidence score is associated with one of the classification of the fecal matter or the health assessment of the animal.

One embodiment further comprises detecting a presence of blood in the fecal matter using the one or more machine learning models.

In one embodiment, the health assessment is at least partly based on the detecting the presence of blood.

In one embodiment, the health assessment is at least partly based on at least one of a consistency, a texture, a color, a size, a shape, a volume, a presence of solids, a water content, or a presence of inorganic material of the fecal matter which was determined using the one or more machine learning models.

In one embodiment, the recommendation comprises a recommendation for one or more pet products.

In one embodiment, the health assessment is generated partly based on one or more additional inputs, the one or more additional inputs including at least one of an activity level of the animal, the animal's diet, or a microbiome analyses of a sample of the animal's fecal matter.

One embodiment further comprises receiving a digital input indicating the activity level of the pet from a tracker worn by the pet over a period of time, the tracker comprising at least one of a sensor or an accelerometer.

In one embodiment, the recommendation comprises a recommendation for at least one of a pet service, a change in diet, or an exercise routine.

In one embodiment, the recommendation comprises a recommendation to take the pet to a veterinarian.

In one embodiment, the health assessment is generated partly based on one or more additional inputs, the one or more additional inputs including at least one of a species or a breed of the animal.

In one embodiment, the one or more machine learning models are selected from a set of available machine learning models based on the one or more additional inputs.

In one embodiment, the health assessment is generated partly based on one or more additional inputs, the one or more additional inputs including at least one of an age, a gender, a breed, a weight, or a height of the animal.

In one embodiment, the health assessment is generated partly based on one or more additional inputs, the one or more additional inputs comprising a calculated biological age of the animal.

In one embodiment, the health assessment is generated partly based on one or more additional inputs, the one or more additional inputs comprising a calculated microbiome age status of the animal.

Certain non-limiting embodiments can be directed to computer-readable non-transitory storage media comprising instructions operable when executed by one or more processors to cause a system to perform any of the methods or techniques described herein.

Certain non-limiting embodiments can be directed to a system, which can include one or more processors, one or more computer-readable non-transitory storage media coupled to one or more of the processors and comprising instructions operable when executed by one or more of the processors to cause the system to perform any of the methods or techniques described herein.

The embodiments disclosed herein are only examples, and the scope of this disclosure is not limited to them. Certain non-limiting embodiments can include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies)

can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

In the drawings:

FIG. 4 illustrates an example computer-implemented method for using machine learning systems to classify a pet's fecal matter, according to some non-limiting embodiments.

DESCRIPTION OF EXAMPLE EMBODIMENTS

Figure 1:
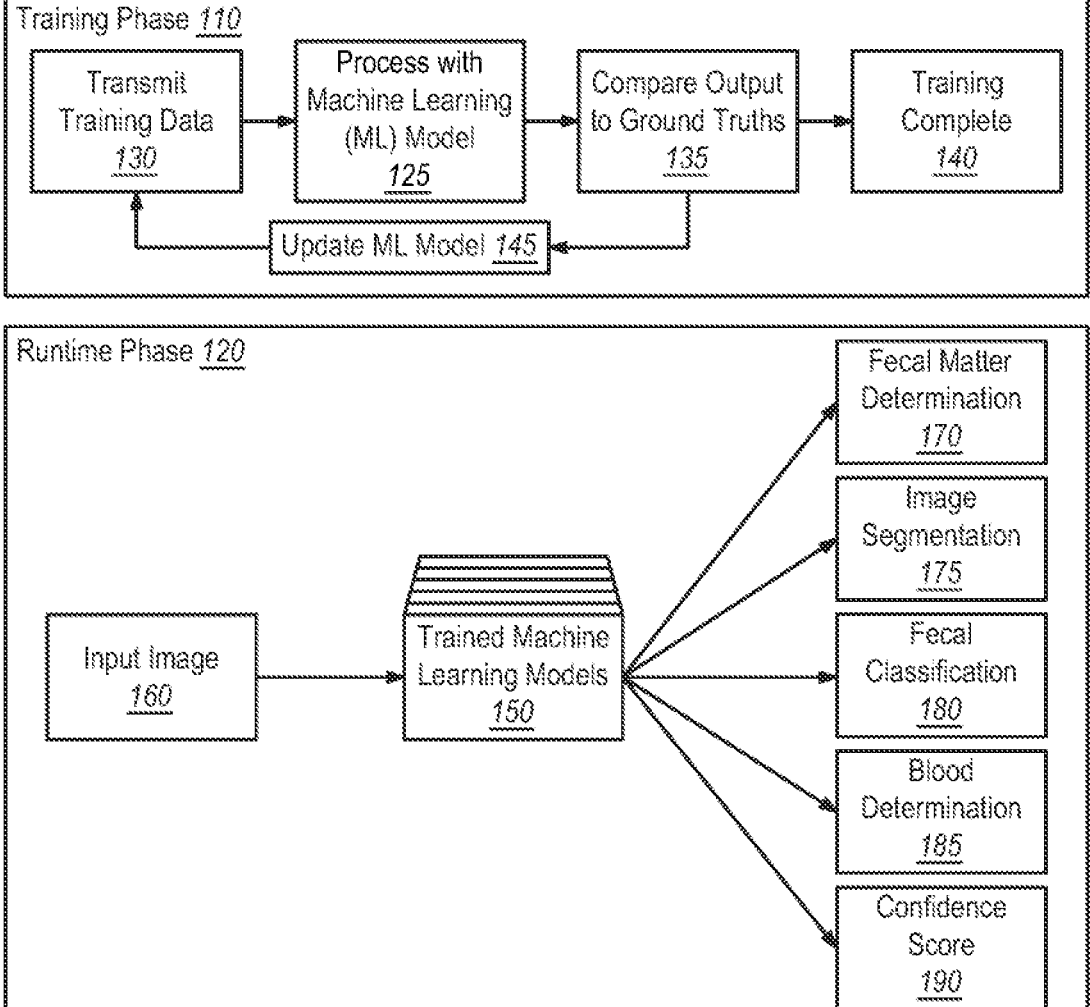
FIG. 1 illustrates an example of a framework for predicting one or more characteristics of fecal matter according to certain non-limiting embodiments.

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

As used in the specification and the appended claims, the singular forms "a," "an" and "the" include plural referents unless the context clearly dictates otherwise.

As used herein, the terms "comprises," "comprising," or any other variation thereof, are intended to cover a non-exclusive inclusion, such that a process, method, article, system, or apparatus that comprises a list of elements does not include only those elements but can include other elements not expressly listed or inherent to such process, method, article, or apparatus.

As used herein, the term "fecal matter" or "feces" as used in accordance with the present disclosure refers to solid or semi-solid excrement discharged from the bowels of an animal or pet.

As used herein, the "characteristic" of the pet fecal matter can be determined based on one or more measurable qualities of the fecal matter. For example, the "characteristic" of the fecal matter can be consistency, texture, color, size, shape, volume, presence of solids, water content, presence of inorganic material, presence of blood, or any other known attributes of a pet's fecal matter.

As used herein, the terms "animal" or "pet" as used in accordance with the present disclosure refers to domestic animals including, but not limited to, domestic dogs, domestic cats, horses, cows, ferrets, rabbits, pigs, rats, mice, gerbils, hamsters, goats, and the like. Domestic dogs and cats are particular non-limiting examples of pets. The term "animal" or "pet" as used in accordance with the present disclosure can further refer to wild animals, including, but not limited to bison, elk, deer, venison, duck, fowl, fish, and the like.

The term "pet product" can include, for example and without limitation, any type of product, service, or equipment that is designed, manufactured, and/or intended for use by a pet. For example, the pet product can be a toy, a chewable, a food, an item of clothing, a collar, a medication, a health tracking device, a location tracking device, and/or any combination thereof. In another example a pet product can include a genetic or DNA testing service for pets.

The term "pet owner" can include any person, organization, and/or collection of persons that owns and/or is responsible for any aspect of the care of a pet.

As used herein, a "training data set" can comprise various data used to train a machine learning model, along with associated metadata, labels, or ground truth data which can be used to facilitate supervised model training. For example, a training data set can include one or more images along with data or metadata associated with each image, respectively. In a first example, a training data set used to train a machine learning classifier to determine if an image comprises a view of animal (e.g., dog) fecal matter can comprise two subsets of images. The first image subset might comprise images of dog fecal matter each labeled with a first label indicating dog fecal matter. The second image subset might comprise an assortment of images not comprising dog fecal matter each labeled with a second label indicating an absence of dog fecal matter. In other instances, the training data and ground truths can be directed to other classifications. For instance, the classification can be directed to a presence or absence of blood. In embodiments, training data and corresponding ground truths can be directed to scoring an image of animal fecal matter, wherein the output score indicates a health metric related to the animal. In a second example, a training data set for an image segmentation task might comprise images of fecal matter each associated with a ground truth of a pixel grid of 0's and 1's to indicate which pixels in the training image correspond to fecal matter. Such a pixel grid can be referred to as a segmentation mask. Similarly, a machine learning model can be trained to predict bounding boxes using a labeled training data set comprising some images of fecal matter surrounded by bounding boxes and some images with no fecal matter and no bounding boxes. A training data set can be collected via one or more client devices (e.g., crowd-sourced) or collected from other sources (e.g., a database). In some embodiments, a labeled training data set is created by human annotators, while in other embodiments a separate trained machine learning model can be used to generate a labeled data set.

In the detailed description herein, references to "embodiment," "an embodiment," "one embodiment," "in various embodiments," "certain embodiments," "some embodiments," "other embodiments," "certain other embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the term "client device" refers to a computing system or mobile device used by a user of a given mobile application. For example, the term "client device" can include a smartphone, a tablet computer, or a laptop computer. In particular, the computing system can comprise functionality for determining its location, direction, or orientation, such as a GPS receiver, compass, gyroscope, or accelerometer. Client device can also include functionality for wireless communication, such as BLUETOOTH communication, near-field communication (NFC), or infrared (IR) communication or communication with wireless local area networks (WLANs) or cellular-telephone network. Such a device can also include one or more cameras, scanners, touchscreens, microphones, or speakers. Client devices can also execute software applications, such as games, web browsers, or social-networking applications. Client devices, for example, can include user equipment, smartphones, tablet computers, laptop computers, desktop computers, or smartwatches.

Example processes and embodiments can be conducted or performed by a computing system or client device through a mobile application and an associated graphical user interface ("UX" or "GUI"). In certain non-limiting embodiments, the computing system or client device can be, for example, a mobile computing system—such as a smartphone, tablet computer, or laptop computer. This mobile computing system can include functionality for determining its location, direction, or orientation, such as a GPS receiver, compass, gyroscope, or accelerometer. Such a device can also include functionality for wireless communication, such as BLUETOOTH communication, near-field communication (NFC), or infrared (IR) communication or communication with wireless local area networks (WLANs), 3G, 4G, LTE, LTE-A, 5G, Internet of Things, or cellular-telephone network. Such a device can also include one or more cameras, scanners, touchscreens, microphones, or speakers. Mobile computing systems can also execute software applications, such as games, web browsers, or social-networking applications. With social-networking applications, users can connect, communicate, and share information with other users in their social networks.

Certain embodiments of the disclosed technology comprise an application program that operates using one or more trained machine learning models. In one embodiment, a user can type in some information about their pet, which can be a dog. This information can include attributes such as a species, age, gender, breed, weight, height, hair color, eye color, or other attributes of the animal. In some embodiments, one or more of these attributes can comprise inputs for one or more of the trained machine learning models. In particular embodiments, the application can use these input attributes to select more specialized machine learning models to make inferences about the animal. For example, the application might use one machine learning model trained for cats, another one for dogs, and another one for birds, and the appropriate model is selected based on the input species. In another example, in the context of dogs, the application might use one machine learning model trained for analyzing the fecal matter of corgis when a user inputs the corgi breed attribute and a different machine learning model trained for analyzing the fecal matter of pit bulls when a user inputs the pit bull breed attribute. Each of these respective models can have been trained using training data comprising views of fecal matter of the respective breed of dog. In one embodiment, once the breed of dog is specified, then an even more specialized machine learning model could be selected for the specified type of animal, based on attributes such as the pet's gender or age.

In various embodiments, two additional attributes which can be processed by the application program of embodiments to generate classifications, assessments, or recommendations are the biological age of the animal or pet or the microbiome age status of the animal or pet. Either of these two additional attributes can be used to select a more specialized machine learning model for classifying the fecal matter depicted in the input image. One or both of the biological age of the animal or the microbiome status of the animal can also be used, in part, to generate a health assessment of the animal, a classification of the fecal matter of the animal, or a recommendation for the animal. In one example, the animal or pet in question is a dog (a canid).

Biological age is a first measure of the health of an animal which is distinct from the chronological age of the animal. However, in a healthy animal, with a suitable lifestyle in terms of diet, activity levels, and access to appropriate veterinary care, the biological age would be expected to be directly related to the chronological age of the animal. However, factors such as poor diets or harsh living conditions can cause a dog to age more quickly. Similarly, a particularly healthy lifestyle involving beneficial diets and exercise levels can lead to a dog having a biological age which is lower than expected as compared to its actual chronological age. The latter is considered to be preferable as this results in an animal which can be healthier overall and have a better longevity.

In one embodiment, a method for determining the biological age of an adult dog can comprise: (i) determining the weight of the adult dog, (ii) allocating the dog to a category selected from the group consisting of toy, small, medium, large or giant, (iii) determining the levels of a biomarker selected from the group consisting of (1) blood globulin levels, (2) blood total protein, (3) blood alkaline phosphatase. (4) blood platelet count, (5) blood mean corpuscular volume or (6) urine specific gravity, and (iv) comparing the results with values obtained from healthy dogs of a known age and of a similar category (toy, small, medium, large or giant). In one embodiment, the user (who can be a researcher or a veterinarian) can upload known or estimated values for one or more of the aforementioned biomarkers using the application, which can compute the biological age of the dog using the uploaded information. In one embodiment, the user (who can be the pet owner) can upload recent veterinary medical records or lab records for the pet, and application program can parse these records to automatically extract values for any of the aforementioned biomarkers present in the records for further processing to determine the biological age of the adult dog.

The disclosed biomarkers can be indicative of the biological age of the animal either alone or in combination. Blood globulin levels are generally determined with a view to providing a diagnosis of a range of diseases and conditions. In healthy dogs, they would typically be in the range of from 1.8-3.9 g/dl. Low globulin levels for instance, can be an indicator of kidney or liver disease, whereas high levels can indicate the presence of an infection, inflammatory disease or immune disorder, or even some types of cancer. Blood total protein is measured routinely in combination with the testing for albumin levels to allow the blood globulin level as described above, to be determined. Typically, in healthy dogs, the total protein levels are in the range of from 5.4-7.5 g/dL. High levels of blood total protein in excess of this range can be a sign of dehydration in the dog, for example as a result of failing to drink, or vomiting or chronic diarrhea. Low levels of blood total protein in adult dogs can be indicative of malabsorption syndromes, resulting from food allergies for instance, or intestinal inflammations such as irritable bowel disease. In a healthy dog, blood alkaline phosphatase (ALK) levels will be in the region of from 24-141 u/L. Increased levels of serum ALK Is typically used as a diagnostic marker for liver or heart disease, as well as some genetic disorders of particular breeds. These include Dobermans, Bedlington terriers or West Highland terriers who can be prone to copper storage diseases. Blood platelet counts are measured to detect thrombocytopenia or thrombocytosis in dogs. Healthy dogs have a blood platelet count between 175,000-200,000 platelets per microliter of blood. Low values (thrombocytopenia) can be caused by hemorrhaging, for example as a result of trauma or of spontaneous internal bleeding but can also be indicative of underlying disease such as cancers or tick-borne disease. High values (thrombocytosis) can be a temporary response to epinephrine release, but it can be a sign of an underlying bone marrow disease. Blood mean corpuscular volume (MCV) is typically measured to determine whether a dog is suffering from iron deficiency or liver disease, which can result in a decreased MCV, or regenerative anemia, which can result in an increase MCV A typical red blood cell is about 7 microns wide in a healthy dog. Urine specific gravity, which would normally be about 1.030 in an adult dog, is measured to determine a range of kidney diseases or disorders.

In embodiments, additional biomarkers can also be used by the application program to determine the biological age of the animal or pet. In particular embodiments, these additional biomarkers can be selected from biomarkers measured in the context of routine clinical evaluation of samples, in particular blood samples. Examples of such biomarkers include Glucose (GLU), Amylase (AMYL), Bilirubin, Total (TBIL), Albumin (ALB), Cholesterol (CHOL), Blood Urea Nitrogen (BUN), Creatinine (CREA), Phosphorous (PHOS), Calcium (CA) and alanine aminotransferease or ALT/SGPT (ALT) and Blood Count (CBC): Red Blood Cell Count (RBC), White Blood Cell Count (WBC), Hematocrit (HCT), Hemoglobin (HGB), Mean Corpuscular Hemoglobin (MCH), Mean Corpuscular Hemoglobin Concentration (MCHC), Red Blood Cell Distribution Width (RDW), Mean Platelet Volume (MPV), Granulocyte %, Lymphocyte %, Monocyte % and Eosinophil %. For example, ALB, AMYL, CHOL, Lymphocyte and Monocyte counts can be specifically useful alongside ALKP for more accurate assessment of a specific breed.

Microbiome age status is a second measure of the health of an animal which is distinct from the chronological age of the animal. The establishment of the microbiome occurs at the same time as development of the immune system and plays a role in intestinal physiology and regulation. The initial establishment of the gut microbiota is an essential step in neonatal development, influencing immunological development in infancy and health throughout life. As such in humans and many mammals a rapid increase in diversity occurs in the early establishment phase of gut microbiome development. The adult gut microbiome can be resilient to large shifts in community structure and in humans and other mammals, it is considered to be relatively stable throughout adult life. This "adult microbiome" is considered to represent a healthy gut microbiome for dogs with enhanced resilience compared to other life stages. In early life stages, puppies have an undeveloped gut barrier, which includes the gastrointestinal microbiome as well as histological and gut associated immune functions. Puppies and young dogs are therefore are more prone to gastrointestinal illnesses such as diarrhea and sickness, etc. Senior and geriatric dogs are also more prone to diarrhea and gastrointestinal complications, which can occur in part as a result of a deterioration in the gut microbiome.

In one embodiment, a method for determining the microbiome age status of a canid can comprise: (a) detecting one or more bacterial taxa in a sample obtained from the canid; (b) correlating the one or more bacterial taxa in the sample to a control data set; and (c) determining the microbiome age. These methods are particularly useful for assessing a canid's health as a discrepancy between the microbiome age and the canid's actual age can be indicative of its health status. For example, in some embodiments, it would be undesirable for an adult dog to have a juvenile microbiome as this is associated with instability or low diversity and result in associated health conditions such as the susceptibility to diarrhea. In one embodiment, the microbiome age of the anima (such as a canid) is generated by the client computing device after receiving information related to the one or more bacterial taxa detected in the sample obtained from the canid and a control data set over a network. In other embodiments, the microbiome status of the canid is calculated by a third party and transmitted to the client device over the network for further processing.

In particular embodiments, the user (for example, a veterinarian, researcher, or pet owner) can capture an image of fecal matter excreted by the animal with a mobile device, which the application can use to generate outputs, as is explained further herein with more specificity. For example, the application could provide an indication of whether the depicted fecal matter is normal or abnormal using the GUI. The application can detect the presence of blood and can flag certain areas of the input image where blood is present. The application can score the input image with a classification score and classify the input image according to a classification scale. The application can also determine one or more other characteristics of the input image such as a texture, a color, a size, or a shape of the fecal matter depicted in the image. In some embodiments, the application can output to the user one or more of the determined characteristics of the fecal matter, or data indicating the classification score using the GUI.

As explained further herein, the classification score and the fecal matter characteristics, along with additional inputs related to the animal, can be used by the application to generate one or more health inferences about the animal. These health inferences can include inferences that the animal has a certain illness or condition, or that the animal is healthy. The application can output one or more of the health inferences to the user using the GUI. If a health inference is made that the animal or pet can have a severe condition, then the application could also present to the pet owner a recommendation for a local veterinarian that specialize in the type of pet, as input by the user. The application can also output to the user, using the GUI, various other types of recommendations as explained herein with greater specificity, including recommendations for specific types of products or services for the pet, or nutritional recommendations.

The collected data used to both train the machine learning model used by the system, as well as the input provided by the user of a mobile application, can be one or more images or videos of fecal matter. Previous methods rely mainly on visual inspection of samples by trained professionals (e.g., a veterinarian) can be inconvenient for pet owners. In some non-limiting embodiments, a framework is presented to predict the qualities or features of the fecal matter from collected data using one or more machine learning models. In certain non-limiting embodiments, one or more machine learning models, such as K-nearest neighbor (KNN), naïve Bayes (NB), decision trees or random forests, support vector machine (SVM), a deep learning model, a Transformer model, or any other machine learning model or technique, can be used to predict a qualities, characteristics, or features of fecal matter based on collected data. The machine learning models can be supervised, unsupervised, or semi-supervised. Supervised machine learning can be used to model a function that maps an input to an output based on an example input-output pairs provided by a human supervising the machine learning. Unsupervised machine learning, on the other hand, can be a machine learning model that evaluates previously undetected patterns in a data set without any example input-output pairs. Accordingly, in certain examples pet health can be predicted by outputting qualities or identifying characteristics of fecal matter using one or more machine learning models that receive images of fecal matter and analyzes their characteristics.

In some non-limiting embodiments, the machine learning framework can include one or more convolutional neural network (CNN) components trained from collected training data of fecal matter and corresponding scores. The collected training data, for example, can be one or more images captured by a client device. For example, FIG. 2A depicts an image of fecal matter captured by a client device. The image shown in FIG. 2A, along with one or more other images illustrating pet fecal matter, can be used to train the one or more machine learning models. For example, one type of machine learning model that can be used is a CNN. CNN is a type of artificial neural network comprising one or more convolutional and subsampling layers with one or more nodes. One or more layers, including one or more hidden layers, can be stacked to form a CNN architecture. Disclosed CNNs can learn to determine image parameters and subsequent classification and/or score fecal matter by being exposed to large volumes of labeled training data. While in some examples a neural network can train a learned weight for every input-output pair, CNNs can convolve trainable fixed-length kernels or filters along their inputs. CNNs, in other words, can learn to recognize small, primitive features (low levels) and combine them in complex ways (high levels). Thus, CNNs trained on a synthetic dataset of fecal matter allow for accurate classification and identification of one or more characteristics (e.g., blood or consistency) in fecal matter in real images. The CNN can be supervised or non-supervised.

In certain non-limiting embodiments, pooling, padding, and/or striding can be used to reduce the size of a CNN's output in the dimensions that the convolution is performed, thereby reducing computational cost and/or making over-training less likely. Striding can describe a size or number of steps with which a filter window slides, while padding can include filling in some areas of the data with zeros to buffer the data before or after striding. Pooling, for example, can include simplifying the information collected by a convolutional layer, or any other layer, and creating a condensed version of the information contained within the layers.

In some examples, a region-based CNN (RCNN) or a one-dimensional (1-D) CNN can be used. RCNN includes using a selective search to identify one or more regions of interest in an image and extracting CNN features from each region independently for classification. Types of RCNN employed in one or more embodiments can include Fast RCNN, Faster RCNN, or Mask RCNN. In other examples, a 1-D CNN can process fixed-length time series segments produced with sliding windows. Such 1-D CNN can run in a many-to-one configuration that utilizes pooling and striding to concatenate the output of the final CNN layer. A fully connected layer can then be used to produce a class prediction at one or more time steps.

As opposed to 1-D CNNs that convolve fixed-length kernels along an input signal, recurrent neural networks (RNNs) process each time step sequentially, so that an RNN layer's final output is a function of every preceding timestep. In certain embodiments, an RNN variant known as long short-term memory (LSTM) model can be used. LSTM can include a memory cell and/or one or more control gates to model time dependencies in long sequences. In some examples the LSTM model can be unidirectional, meaning that the model processes the time series in the order it was recorded or received. In another example, if the entire input sequence is available two parallel LSTM models can be evaluated in opposite directions, both forwards and backwards in time. The results of the two parallel LSTM models can be concatenated, forming a bidirectional LSTM (bi-LSTM) that can model temporal dependencies in both directions.

In some embodiments, one or more CNN models and one or more LSTM models can be combined. The combined model can include a stack of four unstrided CNN layers, which can be followed by two LSTM layers and a softmax classifier. A softmax classifier can normalize a probability distribution that includes a number of probabilities proportional to the exponentials of the input. The input signals to the CNNs, for example, are not padded, so that even though the layers are unstrided, each CNN layer shortens the time series by several samples. The LSTM layers are unidirectional, and so the softmax classification corresponding to the final LSTM output can be used in training and evaluation, as well as in reassembling the output time series from the sliding window segments. The combined model though can operate in a many-to-one configuration.

FIG. 1 illustrates an example of a framework for classification of one or more characteristics of fecal matter according to certain non-limiting embodiments. The framework, for example, can include a training phase 110 and a runtime phase 120. During the training phase 110, each of one or more machine learning models 125 can be trained to receive training data 130 and ground truth information related to a classification of an animal or pet's fecal matter depicted in a training image. In some non-limiting embodiments, four separate or distinct machine learning models can be trained, either successively or simultaneously, to accurately perform the operations described herein. In other embodiments, any other number of separate or distinct machine learning models can be used. During training phase 110, a machine learning model 125 can be exposed to one or more sets of training data 130, for example training images, to improve the accuracy of its outputs. The images, for example, can be of animal or pet fecal matter captured by a client device. Each set of training data 130 can comprise a training image comprising a view of fecal matter, associated data, and a corresponding ground truth associated with the image. In some embodiments, the associated data is information about the animal or pet in the form of one or more measurable attributes. These attributes can include the animal's age, gender, breed, weight, height, hair color, eye color, or other attributes. Upon the machine learning model 125 generating one or more outputs, the outputs can be compared to one or more ground truths 135 associated with the training data. For example, a ground truth can be a measure of consistency (e.g., on a scale from 1-100) of the animal's fecal matter, which is information that could be used to indicate a healthier pet. For example, a consistency measure of 70-100 might be inferred to indicate a normal or healthy animal. Another example can be a binary ground truth regarding whether a particular instance of fecal matter contains blood. Other example ground truths could be a texture, a color, a size, a shape, a volume a presence of solids, a water content, or a presence of inorganic material of the fecal matter, any of which might be respectively graded on a scale of 1-100, or on another scale. A loss, which is the difference between the output and the ground truth can be backpropagated and used to update 145 the parameters of the machine learning model 125 so that the machine learning model 125 can exhibit improved performance when exposed to future data. After the machine learning model 125 has been updated 145, a training iteration can be considered complete. Other embodiments can utilize unsupervised machine learning without one or more ground truths 135. If it is determined the machine learning models outputs are within a certain degree of accuracy from the corresponding ground truths, training of the machine learning models can be deemed complete 140. If the machine learning models outputs are inaccurate, the process can return to transmitting training data 130 to the machine learning models 125. The process can be repeated until the predicted outputs of the machine learning models are sufficiently accurate. In certain embodiments, the training phase 110 can be automated and/or semi-automated, meaning that the training phase 110 can be supervised or semi-supervised. In semi-automated models, the machine learning can be assisted by a human programmer that intervenes with the automated process and helps to identify or verify one or more trends or models in the data being processed during the machine learning process.

The training data 130 can be collected via one or more client devices (e.g., crowd-sourced) or collected from other sources (e.g., a database). In one non-limiting example, the sets of training data 130 collected from the one or more client devices can be combined with sets of training data from another source. The collected training data 130 can be aggregated and/or classified in order to learn one or more trends or relationships that exist in the data sets. The sets of training data 130 can be synchronized and/or stored along with the data collected from one or more sensors on a client device, for example a time or location associated with a particular training image. The data comprising the training data can be synchronized manually by a user or automatically. The combined training images and data from the one or more sensors can be analyzed using machine learning or any of the algorithms described herein. Certain images can also be used as validation data or test data. The training data can comprise thousands of images and corresponding ground truths. During training, the parameters of one or more machine learning models can be modified to be able to accurately predict a classification and identify one or more characteristics of the fecal matter. For example, the system of certain embodiments can perform a fecal matter determination 170, an image segmentation of the fecal matter 175, a fecal matter classification 180, or a blood presence determination 185, and a confidence score 190 can be associated with one or more of these.

In some non-limiting embodiments, each set of training data can comprise a training image and corresponding labels or ground truth data. FIG. 2A depicts a sample training image according to some non-limiting embodiments. As depicted, the training input image can capture fecal matter 210 on a background, for example a bed of leaves or pavement. Although not depicted, in some non-limiting embodiments a training image can further capture a reference object with known size and shape that can be utilized to determine the size of the fecal matter in the training input image. Each training input image as depicted in FIG. 2A can be associated with one or more outputs that serve as ground truths to train the one or more machine learning models. These ground truth outputs can include, for example, a bounding box around the fecal matter in the training image, a segmentation mask of the training image that identifies the pixels of the training image that depict the fecal matter in the training image, a classification score of the fecal matter in the training image, or an identification of one or more characteristics in the fecal matter in the training image. These characteristics can comprise shape, size, consistency, volume, color, presence of solids, water content, or presence of inorganic material. The classification score can be in the range of 0-10 or 0-100 and it can correspond to a classification or categorization of the fecal matter based on a predetermined classification scale. In one non-limiting embodiment the classification scale can be a 17-point scale. In some embodiments, the scale dictates that classification scores at the upper end of the scale (near 17) and the lower end of the scale (near 0) are unacceptable, while scores in a middle band (for example, 4-11) are acceptable. In one embodiment, the lower classification scores on the scale can indicate that the fecal matter is too dry to be healthy, while higher classification scores on the scale indicate that the fecal matter is too loose to be healthy. Thus, in one embodiment, a mid-range classification score can indicate that the fecal matter is healthy or acceptable. A confidence value can be output indicating a probability of the detected input being properly classified by the learned model. The higher the confidence value, the more likely it is that the inputted data is being properly modeled. The confidence value, for example, can represented by a percentage from 0 to 100%, with 0% meaning no confidence and 100% meaning absolute or full confidence.

In some non-limiting embodiments, a first machine learning model can be trained to identify fecal matter in a training image. The first machine learning model can be trained to output bounding boxes (not depicted) around one or more instances of animal or pet fecal matter in an input image through supervised training. The first model can be trained using ground truth images with bounding boxes around depicted fecal matter. Through this training process, the model's parameters can be updated so that the model can make better predictions of where the appropriate bounding boxes should be, in some non-limiting embodiments this determination can comprise a binary ("yes"/"no") determination about the presence of fecal matter in an image. In the case of a "no" determination, no bounding boxes will be outputted. The first machine learning model can be trained on thousands of images, some of which contain fecal matter while others do not, crop the image so that we know where the object of interest is within the image.

The bounding box outputs train the machine learning model to detect fecal matter 210 in the training image and to distinguish between, for example, multiple instances of fecal matter 210 depicted in an image. The bounding box can also be used to crop the image so that only the cropped portion is fed to the next machine learning model for processing (e.g., a machine learning model programmed to output a segmentation mask will only need to process the pixels within the bounding box, not the entire image). In embodiments, this process improves the accuracy and performance of the disclosed methods. In practice, one or more machine learning models can need to distinguish between each fecal matter 210 in an image to more accurately predict an output for each fecal matter 210 in the image.

In certain non-limiting embodiments, a second machine learning model can be trained to generate a segmentation mask, which in turn is used to segment the training image or an image with bounding box(es). The segmentation mask can then be used to subtract the background image data from the foreground image data to isolate the fecal matter, thereby generating a segmented or isolated image.

Figure 2B:
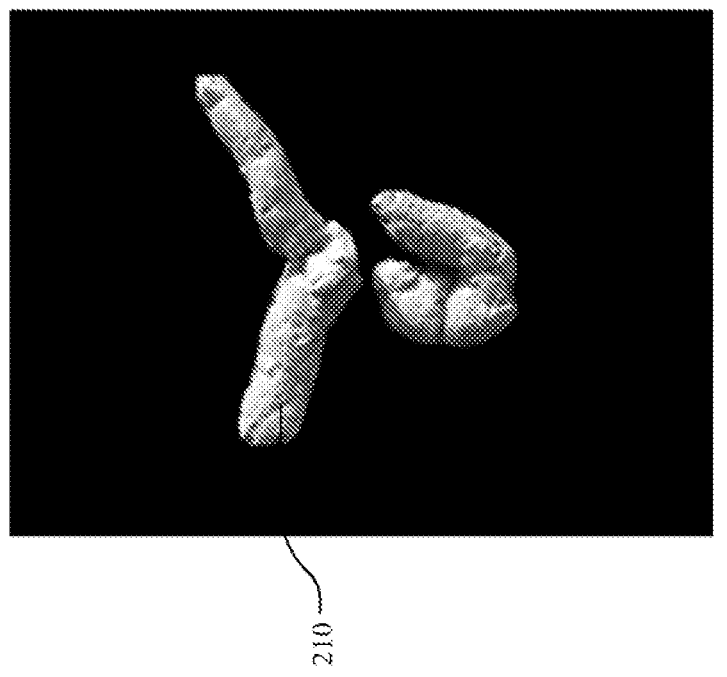
FIG. 2B depicts the result of applying a segmentation mask to an image that includes a view of fecal matter according to some non-limiting embodiments.
Figure 2A:
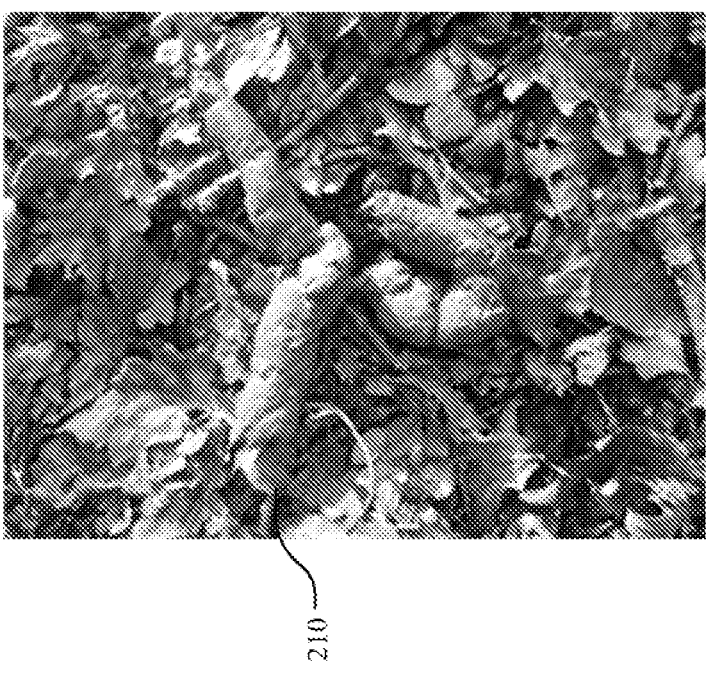
FIG. 2A depicts a sample training image according to certain non-limiting embodiments.

FIG. 2B illustrates an isolated image containing only fecal matter according to some non-limiting embodiments. Removing the background from the fecal matter in the image can result in more accurate classification and identification of features of fecal matter, without any possible influence or interference from any surrounding objects or background in the original input image. Thus, foreground visual data (e.g., fecal matter) can be distinguished from background visual data (e.g., leaves, pavement, carpet, flooring, etc.). Notably, in embodiments that use the segmented or isolated images for the classification task, the ground truths used to train the classifier models should also be isolated images of fecal matter, with backgrounds removed, along with the labels for the appropriate classification.

In some embodiments the second machine learning model can be a Mask RCNN. In certain non-limiting embodiments, the second machine learning model outputs a segmentation mask that identifies and segments one or more instances of fecal matter in the input image from a background or one or more objects. In particular non-limiting embodiments, the segmentation mask can be generated by various machine learning models, for example and not by way of limitation, a CNN. The machine learning model can be any type of neural network model suitable for performing computer vision tasks. For example, the CNN can be trained using the training sets to process and receive a training input image as depicted in FIG. 2A, and output a segmentation mask which can be applied to FIG. 2A to generate a segmented or isolated image. This segmented or isolated image, which is depicted in FIG. 2B, depicts substantially only one or more instances of fecal matter 210 in the input image. In some non-limiting embodiments, the segmentation mask can be represented as a two-dimensional matrix, with each matrix element corresponding to a pixel in the training image. Each element's value corresponds to whether the associated pixel belongs to fecal matter in the image. Although particular data representations for detected fecal matter and segmentation information are described, this disclosure contemplates any suitable data representations of such information. During training, the outputted segmentation mask can be compared to the ground truth that corresponds to the training image to assess the accuracy of the one or more machine learning models. The ground truth in this instance is a known segmentation mask for the training image.

In some non-limiting embodiments, a third machine learning model can be trained to score the resulting image of the fecal matter according to a predetermined classification scale. For example, a predetermined scale or number of categories can be assigned to each fecal matter in the input image based on any number of qualities or characteristics, for example the size, shape, volume, color, presence of solids, water content, presence of inorganic material, or a presence of blood in the fecal matter. The third machine learning model can be trained on thousands of images, which can have different scale or categorization based on the qualities described above. The third machine learning model can receive the isolated image (as depicted in FIG. 2B) to classify the fecal matter. In certain non-limiting embodiments, the third machine learning model can be a deep learning model, such as a CNN. For example, the machine learning model can be an EfficientNetB4, it is named FQNet. In some embodiments, a human subject matter expert or a programmer can label training data for use as ground truth by classifying or categorizing the training data. Therefore, in some embodiments the training of the third machine learning model can include a metric called "accuracy in a range", which reflects the ability of the model to either predict the correct categorization or score, or to determine a correct categorization or score that is within a predetermined range of the score or categorization of the training data.

In some non-limiting embodiments, the outputs of the third machine learning model can comprise a classification score for the fecal matter which can correspond to a classification scale (as described further herein with more specificity), and which can form the basis for a health inference about the animal or pet. The classification score can reflect a predicted health of the pet, specifically as it pertains to the pet's digestive system. For example, a particular fecal matter can be categorized on a 1 to 10 scale, with 1 indicating the healthiest prediction based on the fecal matter, and a 10 indicating the least healthy prediction. In other embodiments the fecal matter can simply be classified as "healthy" or "not healthy". In some non-limiting embodiments, the outputs can further comprise a confidence score that corresponds to the classification or categorization associated with the fecal matter in the image. The confidence value can be a percentage that reflects the likelihood that the machine learning model made an accurate prediction with regard to the classification or categorization of each fecal matter in the image (e.g., a confidence value of 100 can indicate full-confidence in the output, whereas a confidence value of 0 can indicate no confidence in the output).

In some non-limiting embodiments, a fourth machine learning model can be trained to identify the presence of the one or more characteristics in the fecal matter. In certain non-limiting embodiments this determination can comprise a binary ("yes"/"no") determination. For example, the presence of blood in the fecal matter can be a binary determination. Identifying blood is often an indicator of health problems in a pet. In other embodiments, the determination can further comprise determining other characteristics, qualities, or properties, such as the quantity of blood in the fecal matter or the consistency of the fecal matter. The fourth machine learning model can be trained on thousands of images, some of which contain the one or more characteristics for which the machine learning model is trained to identify.

Returning to FIG. 1, once training is complete 140, then the computing system can utilize the trained machine learning models 150 during the runtime phase 120. The trained machine learning models 150 can be accessed to predict the one or more outputs related to fecal matter from the input images. For example, a new input image 160 of fecal matter can be provided to the trained machine learning models 150. The input images 160 could be photographic images, depth images (such as laser scans, millimeter wave data, etc.), 3D data projected into a 2D plane, thermal images, 2D sensor data, video, or any combination thereof. In some non-limiting embodiments, the input image 160 can be preprocessed (e.g., resized, normalized, or converted to a different format). The input image 160 can be transmitted to one or more trained machine learning models 150, which predicts, for example, a classification of the fecal matter 180 and the presence of blood fecal matter 185 in the input image 160. This prediction output can also be, for example, a binary (e.g., "yes" or "no") determination of fecal matter 170 in the image. Moreover, as explained herein with more specificity, there can also be outputs used for image segmentation 175, including bounding boxes or segmentation masks. And in some embodiments, the trained machine learning models 150 are programmed to output confidence scores 190 associated with one or more of the other outputs.

Figure 3:
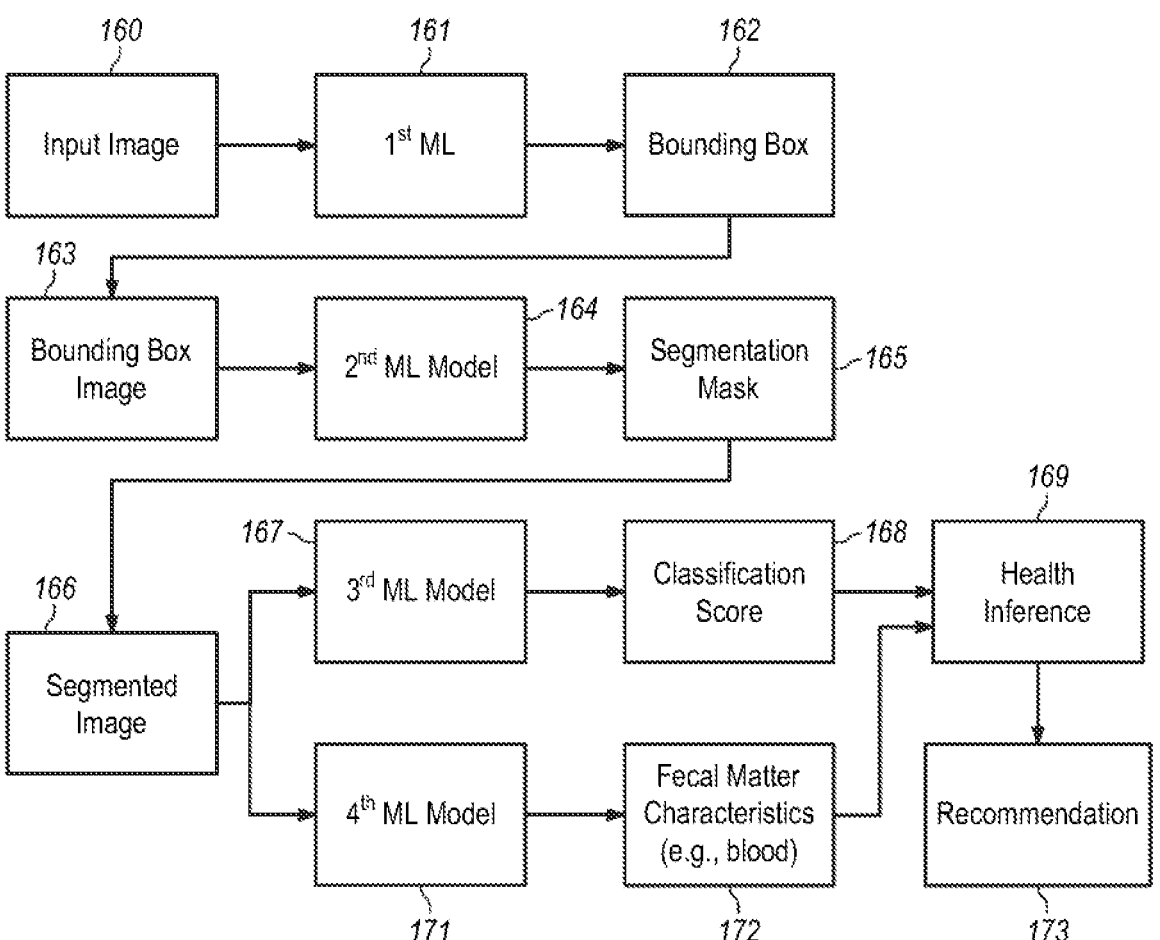
FIG. 3 depicts a sample input image being processed using one or more machine learning models according to certain non-limiting embodiments.

FIG. 3 depicts a sample input image being processed using one or more machine learning models according to certain non-limiting embodiments. Upon receiving an input image 160, the first trained machine learning model 161 can determine whether input image 160 contains fecal matter. In some embodiments, the first trained machine learning model 161 can also output a bounding box 162. The bounding box 162 can serve the dual purpose of object detection (i.e., indicating the presence of fecal matter in the image) and locating the fecal matter within the image. Locating the fecal matter within the image can allow the system to perform a post-processing step to crop out only the pixels within the bounding box 162 so that the second machine learning model 162 only needs to deal with the more focused data. Thus, an image with one or more bounding boxes 163 can be generated, and in some embodiments, this image can be used as the input to a second machine learning model 164. In some non-limiting embodiments, the first machine learning model 161 can comprise a Resnet34 model pretrained on ImageNet.

Upon determining the image contains fecal matter, the input image 160 is transmitted to the second trained machine learning model 164, which generates a segmentation mask 165, which in turn is used to segment the input image 160 or the image with the bounding box(es) 163. The segmentation mask 165 can then be used to subtract the background image data from the foreground image data to isolate the fecal matter, thereby generating a segmented image 166, which can be referred to as an isolated output image. In some non-limiting embodiments, the second machine learning model 164 can comprise a Mask R-CNN. In one embodiment, this Mask R-CNN can be programmed with the Resnet50 architecture. One advantage of isolating the fecal matter in the segmented image 166 is that it can allow additional machine learning models to focus on the important features of the input image 160.

The segmented image 166 can then be transmitted to a third machine learning model 167, which outputs a predicted classification score 168 for the fecal matter. In various embodiments, the classification score 168 can be in the range of 0-10 or 0-100 and it can correspond to a classification or categorization of the fecal matter based on a predetermined classification scale.

Finally, segmented image 166 can be transmitted to a fourth machine learning model 171, which can classify the segmented output image based on a determination of whether one or more characteristics 172 are present in the fecal matter. This prediction output can be, for example, a binary (e.g., "yes" or "no") determination of blood presence in the fecal matter, in some embodiments, fecal matter characteristics 172 besides blood can be predicted by the fourth machine learning model 171, including one or more of size, shape, volume, color, presence of solids, water content, presence of inorganic material, consistency, or texture of the fecal matter. In certain embodiments the fourth machine learning model 171 can comprise a residual neural network (RNN) or an R-CNN. For example, the fourth machine learning model 171 can be programmed according to the ResNet34 architecture.

Some embodiments can include making a health inference 169 about the animal based at least in part on the classification score 168 and/or the fecal matter characteristics 172. Example health inferences 169 include that the animal is sick, has cancer, has an intestinal parasite, has a stomach or intestinal ulcer, has bowel inflammation, or that the animal has swallowed a small toy or any other indigestible material. As explained further herein, certain embodiments can also include other input data in making a health inference 169 about the animal besides the outputs of the third machine learning model and the fourth machine learning model 171. Moreover, the health inference 169 can be used to make one or more recommendations 173 for the animal or a pet owner, if the animal is a pet, as is explained further herein with more specificity.

In some non-limiting embodiments, an API module can collect the outputs of the four machine learning models along with a confidence score for each determination. The outputted classification (based on the output classification score and the classification scale) or the determination of the one or more characteristics can be transmitted to the client device or another device on the network. In some embodiments, data indicating the health inference 169 about the animal or one or more recommendations 173 for the animal can also be transmitted to the client device or another device on the network. In other embodiments, the processing occurs on-device, for example using an application executing on a mobile device of the pet owner. In some non-limiting embodiments, the output data can be generated in a particular format, for example JSON, that can be utilized for a wide variety of applications. In one embodiment the machine learning models are programmed in Python and certain embodiments can use Python code libraries. In one embodiment a RESTful API is hosted in a docker container deployed to the cloud and secured through an API management service. The docker container can include various libraries and modules used by certain embodiments. For example, the docker container can include FastAPI for the RESTful API engine, fastai and PyTorch for the Resnet34 models and the EfficientNetB4 model, and Detectron2 for the MaskRCNN ResNet50 model.

In some non-limiting embodiments, the trained machine learning models can be stored on and used with a computing system associated with a network, such that the trained machine learning models can be accessed by a client device, through for example a mobile application. In some non-limiting embodiments a user can capture an input image using one or more cameras associated with the client device (e.g., a camera on a smartphone) and upload the input image to the network through a GUI on the mobile application. The GUI can comprise functionality that permits a user to, for example, capture and upload image data, view output predictions, and transmit output functionality to one more other users. In some non-limiting embodiments, the captured input image can be associated with a time or a location, which can be inputted by the user or automatically obtained by accessing a current location of the client device. The input image 160 can then be presented to the one or more trained machine learning models as described, which responds with one or more of the outputs disclosed herein. In some non-limiting embodiments this process can be run on a client device with limited or no network connectivity, for example a computer or smartphone with limited cellular reception. The client device can receive the latest updated version of the trained machine learning models from a computing system associated with a server prior to losing network connectivity. In other non-limiting embodiments, the client device can transmit the presented input image 160 to the computing device on a network (e.g., server) via one or more links where the trained CNN 150 can perform the operations described herein. The server, for example, can be a cloud server. The computing device can utilize a machine learning tool, for example, the trained machine learning models, to predict outputs, for example the classification, presence of blood, or one or more other parameters of fecal matter in the input image. The computing device on the network then transmits the one or more outputs back to the client device.

In some non-limiting embodiments, the trained machine learning models can be used to predict outputs for images of fecal matter over a particular unit of time or based on one or more inputted images. For example, a single prediction can be determined per image or for a given period of time. On the other hand, in other non-limiting embodiments, rather than providing an output based on a particular period of time or a single image, the machine learning model or tool can run on an aggregated amount of data or multiple input images. The images received can be aggregated before being fed into the trained machine learning models, thereby allowing an analysis of a cumulative representation of fecal matter. The aggregation of data, for example, can break the data points into minutes of an hour, hour of a day, day of week, month of year, or any other periodicity that can ease the processing and help the modeling of the machine learning tool. When the data is aggregated more than once, there can be a hierarchy established on the data aggregation. The hierarchy can be based on the periodicity of the data bins in which the aggregated data are placed, with each reaggregation of the data reducing the number of bins into which the data can be placed.

In further examples, the aggregated data can be reaggregated into a smaller number of bins to help further reduce the number data points to be processed by the machine learning models. By running on an aggregated amount of data can help to produce a cumulative or representative prediction. The other non-limiting embodiments can learn and model trends in a more efficient manner, reducing the amount of time needed for processing and improving accuracy. The aggregation hierarchy described above can also help to reduce the amount of storage. Rather than storing raw images or data that is lower in the aggregation hierarchy, some non-limiting embodiments can store images in a high aggregation hierarchy format.

In some other embodiments, the aggregation can occur after the machine learning process using the neural network, with the data merely being resampled, filtered, and/or transformed before it is processed by the machine learning models. The filtering can include removing interference, such as brown noise or white noise. The resampling can include stretching or compressing the data, while the transformation can include flipping the axes of the received data. The transformation can also exploit natural symmetry of the data signals, such as left/right symmetry and different collar positions. In some embodiments, data augmentation can include adding noise to the signal, such as brown, pink, or white noise.

In certain embodiments a user can use a client device to capture an image of a pet's fecal matter. These embodiments can implement Client-Server architecture and follow a Software as a Service (SaaS) model. Once the image is captured, a mobile application located on the client device can assess the captured image. Before using the mobile application, a user can undergo a registration process during which the user can submit personal information about themselves and about their pet. This personal information can include, for example and not by way of limitation, the user's name, username, password, email address, physical address, date of birth, and telephone number (e.g., number, expiration date, etc.). Personal information related to the pet, such as medical information, date of birth, species, or any other information can be entered. In some non-limiting embodiments registration can further include an authentication or security process to verify the identity of the user (e.g., two-step verification via an email or text message). Upon completion of registration, the computing system can securely transmit the user's entered information to a server or website associated with a database. Further, in some non-limiting embodiments the server or website can comply with local, state, national, or international standards and laws related to the protection of personal identifiable information.

The mobile application can be used to connect the user to a network device, such as a server or cloud server. Once the image of the pet's fecal matter is captured by the client device, the image can be forwarded to a network device, which can then analyze the image according to the above embodiments. Based on the image, and one or more detected characteristics of the fecal matter, guidance related to the pet's health can be provided to the user via the mobile application. For example, if a certain amount of blood is detected in the fecal matter, a notification or alert can be displayed on the client device as a health recommendation. On the other hand, based on the detected consistency of the fecal matter the mobile application can recommend that a pet be given a specific pet food or pet food product. For example, the pet food can be a snack with a high fiber content. In another example, the mobile application can recommend seeking further services, such as further diagnosis of the fecal matter, for example, the microbiome of the fecal matter.

In certain non-limiting embodiments, the recommendation can be determined and transmitted to one or more of a pet owner, a veterinarian, a researcher and/or any combination thereof. The recommendation, for example, can include one or more health recommendations for preventing the pet from developing one or more of a disease, a condition, an illness and/or any combination thereof. The recommendation, for example, can include one or more of: a food product, a pet service, a supplement, an ointment, a drug to improve the wellness or health of the pet, a pet product, and/or any combination thereof. In other words, the recommendation can be a nutritional recommendation. In some embodiments, a nutritional recommendation can include an instruction to feed a pet one or more of: a chewable, a supplement, a food and/or any combination thereof. In some embodiments, the recommendation can be a medical recommendation. For example, a medical recommendation can include an instruction to apply an ointment to a pet, to administer one or more drugs to a pet and/or to provide one or more drugs for or to a pet.

In certain embodiments, the determined one or more characteristics based on the analysis of the image of the pet's fecal matter can be combined with one or more other inputs to provide a comprehensive or synergistic account of the pet's overall health. The one or more other inputs, for example, can include information related to the general health of the pet, such as the quantity of exercise of the pet, the pet's diet, or a microbiome analyses of a sample of the pet's fecal matter. In certain non-limiting embodiments, the quantity of exercise of the pet can be determined based on a tracker worn by the pet. The tracker worn by the pet can user one or more sensors or accelerometers to determine the level of activity of a pet. This comprehensive or synergistic account of the pet's overall health can be performed and tracked over time to determine when an intervention would be needed. When an intervention would be needed, the system can provide one or more recommendations to the pet owner. As described above, the recommendation can include, for example, a pet service, a change in diet, an exercise routine, or any other recommendation that can improve the health of the pet.

FIG. 4 illustrates an example computer-implemented method 400 for using machine learning systems to classify pet information, according to some non-limiting embodiments. The method can begin at step 410 with receiving an input image from a client device. The input images could be photographic images, depth images (such as laser scans, millimeter wave data, etc.), 3D data projected into a 2D plane, thermal images, 2D sensor data, video, or any combination thereof. In some non-limiting embodiments a user can capture an input image using a client device using one or more cameras associated with the client device (e.g., a camera on a smartphone) and upload the input image to the network through a GUI on the mobile application. The method 400 can execute step 415 with determining that the input image comprises a view of fecal matter excreted by an animal. The method 400 can execute step 420 with processing at least a portion of the input image comprising the view of the fecal matter using one or more machine learning models to generate a classification of the fecal matter or a health assessment of the animal. The method 400 can execute step 430 with generating a recommendation for the animal based on the classification of the fecal matter or the health assessment of the animal. The method 400 can execute step 440 with displaying information related to the recommendation for the animal to a user.

Certain non-limiting embodiments can repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for using machine learning systems to classify fecal matter including the particular steps of the method of FIG. 4, this disclosure contemplates any suitable method for using machine learning systems to classify fecal matter including any suitable steps, which can include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
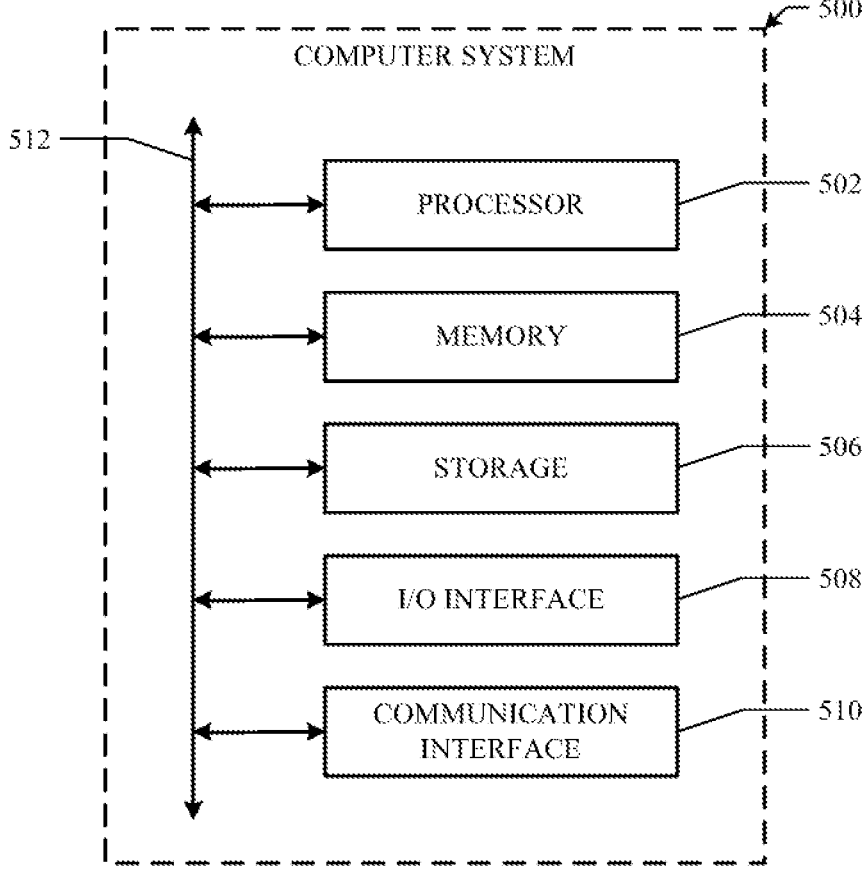
FIG. 5 illustrates an example computer system used to facilitate prediction of fecal matter classifications using machine learning tools, according to certain non-limiting embodiments.

FIG. 5 illustrates an example computer system 500 used to facilitate prediction of fecal matter classifications using machine learning tools, according to some non-limiting embodiments. In certain non-limiting embodiments, one or more computer systems 500 perform one or more steps of one or more methods described or illustrated herein. In certain other non-limiting embodiments, one or more computer systems 500 provide functionality described or illustrated herein. In certain non-limiting embodiments, software running on one or more computer systems 500 performs one or more steps of one or more methods described or illustrated herein or provides functionality described or illustrated herein. Some non-limiting embodiments include one or more portions of one or more computer systems 500. Herein, reference to a computer system can encompass a computing device, and vice versa, where appropriate. Moreover, reference to a computer system can encompass one or more computer systems, where appropriate.

This disclosure contemplates any suitable number of computer systems 500. This disclosure contemplates computer system 500 taking any suitable physical form. As example and not by way of limitation, computer system 500 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 can include one or more computer systems 500; be unitary or distributed; span multiple locations; span multiple machines; span multiple data centers; or reside in a cloud, which can include one or more cloud components in one or more networks. Where appropriate, one or more computer systems 500 can perform without substantial spatial or temporal limitation one or more steps of one or more methods described or illustrated herein. As an example and not by way of limitation, one or more computer systems 500 can perform in real time or in batch mode one or more steps of one or more methods described or illustrated herein. One or more computer systems 500 can perform at different times or at different locations one or more steps of one or more methods described or illustrated herein, where appropriate.

In certain non-limiting embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In some non-limiting embodiments, processor 502 includes hardware for executing instructions, such as those making up a computer program. As an example and not by way of limitation, to execute instructions, processor 502 can retrieve (or fetch) the instructions from an internal register, an internal cache, memory 504, or storage 506; decode and execute them; and then write one or more results to an internal register, an internal cache, memory 504, or storage 506. In certain non-limiting embodiments, processor 502 can include one or more internal caches for data, instructions, or addresses. This disclosure contemplates processor 502 including any suitable number of any suitable internal caches, where appropriate. As an example, and not by way of limitation, processor 502 can include one or more instruction caches, one or more data caches, and one or more translation lookaside buffers (TLBs). Instructions in the instruction caches can be copies of instructions in memory 504 or storage 506, and the instruction caches can speed up retrieval of those instructions by processor 502. Data in the data caches can be copies of data in memory 504 or storage

506 for instructions executing at processor 502 to operate on; the results of previous instructions executed at processor 502 for access by subsequent instructions executing at processor 502 or for writing to memory 504 or storage 506; or other suitable data. The data caches can speed up read or write operations by processor 502. The TLBs can speed up virtual-address translation for processor 502. In some non-limiting embodiments, processor 502 can include one or more internal registers for data, instructions, or addresses. This disclosure contemplates processor 502 including any suitable number of any suitable internal registers, where appropriate. Where appropriate, processor 502 can include one or more arithmetic logic units (ALUs); be a multi-core processor; or include one or more processors 502. Although this disclosure describes and illustrates a particular processor, this disclosure contemplates any suitable processor.

In some non-limiting embodiments, memory 504 includes main memory for storing instructions for processor 502 to execute or data for processor 502 to operate on. As an example, and not by way of limitation, computer system 500 can load instructions from storage 506 or another source (such as, for example, another computer system 500) to memory 504. Processor 502 can then load the instructions from memory 504 to an internal register or internal cache. To execute the instructions, processor 502 can retrieve the instructions from the internal register or internal cache and decode them. During or after execution of the instructions, processor 502 can write one or more results (which can be intermediate or final results) to the internal register or internal cache. Processor 502 can then write one or more of those results to memory 504. In some non-limiting embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which can each include an address bus and a data bus) can couple processor 502 to memory 504. Bus 512 can include one or more memory buses, as described below. In certain non-limiting embodiments, one or more memory management units (MMUs) reside between processor 502 and memory 504 and facilitate accesses to memory 504 requested by processor 502. In certain other non-limiting embodiments, memory 504 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 504 can include one or more memories 504, where appropriate. Although this disclosure describes and illustrates a particular memory component, this disclosure contemplates any suitable memory.

In some non-limiting embodiments, storage 506 includes mass storage for data or instructions. As an example and not by way of limitation, storage 506 can include a hard disk drive (HDD), a floppy disk drive, flash memory, an optical disc, a magneto-optical disc, magnetic tape, or a Universal Serial Bus (USB) drive or a combination of two or more of these. Storage 506 can include removable or non-removable (or fixed) media, where appropriate. Storage 506 can be internal or external to computer system 500, where appropriate. In certain non-limiting embodiments, storage 506 is non-volatile, solid-state memory. In some non-limiting embodiments, storage 506 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 can include one or more storage control units facilitating communication between processor 502 and storage 506, where appropriate. Where appropriate, storage 506 can include one or more storages 506. Although this disclosure describes and illustrates particular storage, this disclosure contemplates any suitable storage.

In certain non-limiting embodiments, I/O interface 508 includes hardware, software, or both, providing one or more interfaces for communication between computer system 500 and one or more I/O devices. Computer system 500 can include one or more of these I/O devices, where appropriate. One or more of these I/O devices can enable communication between a person and computer system 500. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces 508 for them. Where appropriate, I/O interface 508 can include one or more device or software drivers enabling processor 502 to drive one or more of these I/O devices. I/O interface 508 can include one or more I/O interfaces 508, where appropriate. Although this disclosure describes and illustrates a particular I/O interface, this disclosure contemplates any suitable I/O interface.

In some non-limiting embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 500 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 can include any suitable communication interface 510 for any of these networks, where appropriate. Communication interface 510 can include one or more communication interfaces 510, where appropriate. Although this disclosure describes and illustrates a particular communication interface, this disclosure contemplates any suitable communication interface.

In certain non-limiting embodiments, bus 512 includes hardware, software, or both coupling components of computer system 500 to each other. As an example and not by way of limitation, bus 512 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 can include one or more buses 512, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments can include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates some non-limiting embodiments as providing particular advantages, certain non-limiting embodiments can provide none, some, or all of these advantages.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

The embodiments disclosed herein are only examples, and the scope of this disclosure is not limited to them. Certain non-limiting embodiments can include all, some, or none of the components, elements, features, functions, operations, or steps of the embodiments disclosed above. Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A computer-implemented method comprising:

receiving an input image from a client device;

executing a first machine learning model on the input image to determine that the input image comprises a view of fecal matter excreted by an animal and output a bounding box on the input image locating the fecal matter within the input image, wherein the first machine learning model was trained on images containing fecal matter and bounding boxes around the fecal matter and images not containing fecal matter;

executing a second machine learning model on the input image with the bounding box to generate a segmentation mask on the input image, wherein the second machine learning model was trained on isolated images of fecal matter with background removed;

generating, based on the segmentation mask, a segmented image isolating the fecal matter from a background of the fecal matter;

executing a third machine learning model on the segmented image to predict a classification score for the fecal matter, wherein the third machine learning model was trained on images associated with a plurality of classification scores;

executing a fourth machine learning model on the segmented image to predict characteristics of the fecal matter, wherein the fourth machine learning model was trained on images containing fecal matter associated with a plurality of characteristics;

determining a microbiome age status of the animal based on correlating one or more bacterial taxa detected in the fecal matter to a control data set;

generating a health assessment of the animal based on the classification score and characteristics of the fecal matter and the microbiome age status;

generating a recommendation for the animal based on the health assessment of the animal; and displaying information related to the recommendation for the animal to a user.

2. The computer-implemented method of claim 1, wherein the classification score of the fecal matter indicates a health metric related to the animal.

3. The computer-implemented method of claim 1, further comprising generating and displaying an indication of the confidence score, wherein the confidence score is associated with the classification score of the fecal matter or the health assessment of the animal.

4. The computer-implemented method of claim 1, wherein the characteristics of the fecal matter comprises a presence of blood in the fecal matter.

5. The computer-implemented method of claim 4, wherein the health assessment is at least partly based on the presence of blood.

6. The computer-implemented method of claim 1, wherein the health assessment is at least partly based on at least one of a consistency, a texture, a color, a size, a shape, a volume, a presence of solids, a water content, or a presence of inorganic material of the fecal matter associated with the characteristics of the fecal matter.

7. The computer-implemented method of claim 1, wherein the recommendation comprises a recommendation for one or more pet products.

8. The computer-implemented method of claim 1, wherein the health assessment is generated partly based on one or more additional inputs, the one or more additional inputs comprising at least one of an activity level of the animal, the animal's diet, or a microbiome analyses of a sample of the animal's fecal matter.

9. The computer-implemented method of claim 8, further comprising receiving a digital input indicating the activity level of the pet from a tracker worn by the pet over a period of time, the tracker comprising at least one of a sensor or an accelerometer.

10. The computer-implemented method of claim 8, wherein the recommendation comprises a recommendation for at least one of a pet service, a change in diet, or an exercise routine.

11. The computer-implemented method of claim 8, wherein the recommendation comprises a recommendation to take the pet to a veterinarian.

12. The computer-implemented method of claim 1, wherein the health assessment is generated partly based on one or more additional inputs, the one or more additional inputs comprising at least one of a species or a breed of the animal.

13. The computer-implemented method of claim 12, wherein one or more of the first, second, third, or fourth machine learning model are selected from a set of available machine learning models based on the one or more additional inputs.

14. The computer-implemented method of claim 1, wherein the health assessment is generated partly based on one or more additional inputs, the one or more additional inputs comprising at least one of an age, a gender, a breed, a weight, or a height of the animal.

15. The computer-implemented method of claim 1, wherein the health assessment is generated partly based on one or more additional inputs, the one or more additional inputs comprising a calculated biological age of the animal.

16. One or more computer-readable non-transitory storage media embodying software that is operable when executed to:

receive an input image from a client device;

execute a first machine learning model on the input image to determine that the input image comprises a view of fecal matter excreted by an animal and output a bounding box on the input image locating the fecal matter within the input image, wherein the first machine learning model was trained on images containing fecal matter and bounding boxes around the fecal matter and images not containing fecal matter;

execute a second machine learning model on the input image with the bounding box to generate a segmentation mask on the input image, wherein the second machine learning model was trained on isolated images of fecal matter with background removed;

generate, based on the segmentation mask, a segmented image isolating the fecal matter from a background of the fecal matter;

execute a third machine learning model on the segmented image to predict a classification score for the fecal matter, wherein the third machine learning model was trained on images associated with a plurality of classification scores;

execute a fourth machine learning model on the segmented image to predict characteristics of the fecal matter, wherein the fourth machine learning model was trained on images containing fecal matter associated with a plurality of characteristics;

determine a microbiome age status of the animal based on correlating one or more bacterial taxa detected in the fecal matter to a control data set;

generate a health assessment of the animal based on the classification score and characteristics of the fecal matter and the microbiome age status;

generate a recommendation for the animal based on the health assessment of the animal; and display information related to the recommendation for the animal to a user.

17. The storage media of claim 16, wherein the classification score of the fecal matter indicates a health metric related to the animal.

18. A system comprising:

one or more processors; and one or more computer-readable non-transitory storage media coupled to one or more of the processors and comprising instructions operable when executed by one or more of the processors to cause the system to:

execute a first machine learning model on the input image to determine that the input image comprises a view of fecal matter excreted by an animal and output a bounding box on the input image locating the fecal matter within the input image, wherein the first machine learning model was trained on images containing fecal matter and bounding boxes around the fecal matter and images not containing fecal matter;

execute a second machine learning model on the input image with the bounding box to generate a segmentation mask on the input image, wherein the second machine learning model was trained on isolated images of fecal matter with background removed;

generate, based on the segmentation mask, a segmented image isolating the fecal matter from a background of the fecal matter;

execute a third machine learning model on the segmented image to predict a classification score for the fecal matter, wherein the third machine learning model was trained on images associated with a plurality of classification scores;

execute a fourth machine learning model on the segmented image to predict characteristics of the fecal matter, wherein the fourth machine learning model was trained on images containing fecal matter associated with a plurality of characteristics;

determine a microbiome age status of the animal based on correlating one or more bacterial taxa detected in the fecal matter to a control data set;

generate a health assessment of the animal based on the classification score and characteristics of the fecal matter and the microbiome age status;

generate a recommendation for the animal based on the health assessment of the animal; and display information related to the recommendation for the animal to a user.

* * * * *